US008624756B2

(12) United States Patent
Ganot

(10) Patent No.: US 8,624,756 B2
(45) Date of Patent: Jan. 7, 2014

(54) FULLY AUTOMATED PARKING SYSTEM

(75) Inventor: Zvi Ganot, Beer Sheva (IL)

(73) Assignee: Parx Ltd., Rosh Pina (IL)

( * ) Notice: Subject to any disclaimer, the term of this patent is extended or adjusted under 35 U.S.C. 154(b) by 0 days.

(21) Appl. No.: 13/386,824

(22) PCT Filed: Aug. 23, 2010

(86) PCT No.: PCT/IL2010/000685
§ 371 (c)(1),
(2), (4) Date: Apr. 10, 2012

(87) PCT Pub. No.: WO2011/024161
PCT Pub. Date: Mar. 3, 2011

(65) Prior Publication Data

US 2012/0188101 A1 Jul. 26, 2012

Related U.S. Application Data

(60) Provisional application No. 61/275,500, filed on Aug. 31, 2009.

(51) Int. Cl.
*B60Q 1/48* (2006.01)

(52) U.S. Cl.
USPC ......... 340/932.2; 340/435; 340/436; 340/933

(58) Field of Classification Search
USPC .............................. 340/932.2, 435, 436, 933
See application file for complete search history.

(56) References Cited

U.S. PATENT DOCUMENTS 5,852,411 A * 12/1998 Jacobs et al. ............... 340/932.2
5,910,782 A 6/1999 Schmitt
6,078,272 A * 6/2000 Jacobs et al. ............... 340/932.2
6,081,206 A 6/2000 Kielland
6,275,170 B1 * 8/2001 Jacobs et al. ............... 340/932.2
6,344,806 B1 * 2/2002 Katz .......................... 340/932.2
2002/0008614 A1 1/2002 Yeh et al.
2003/0132840 A1 7/2003 Bahar
2003/0179107 A1 9/2003 Kibria et al.
2006/0152349 A1 7/2006 Ratnakar
2007/0119682 A1 5/2007 Banks et al.

OTHER PUBLICATIONS

International Search Report of Application No. PCT/IL10/00685 mailed on Jan. 11, 2011.

* cited by examiner

*Primary Examiner* — Daryl Pope
(74) *Attorney, Agent, or Firm* — Pearl Cohen Zedek Latzer Baratz LLP

(57) ABSTRACT

The present invention relates to a parking system, which comprises: (a) plurality of Curb Devices for communication with car device and a host, each Curb Device having its own unique Curb Device ID and is installed close to a corresponding parking space; the Curb device is also provided with a sensor for sensing a physical positioning of a car within the respective parking space; (b) plurality of Car Devices, each Car Device is provided with its own unique Car Device ID, and is positioned at a corresponding car at a location which is visible from the outside; and (c) a Host which is provided with Users Data and Parking Spaces Data, for remotely managing, billing, enforcing and controlling on line and in real time parking of vehicles at each of said parking spaces. The invention also enables a driver of a car which is not provided with a car device to use a cellular alternative, where the driver uses his cellular phone to report to the Host the Curb Device ID, as visually displayed, while his phone number serves as a replacement for the Car Device ID. The invention also relates to a parking enforcement by the system of the present invention, which enforces parking in real time, while providing to the enforcement inspector the exact parking location where a proven violation has occurred.

20 Claims, 5 Drawing Sheets

FULLY AUTOMATED PARKING SYSTEM

FIELD OF THE INVENTION

The present invention relates to the field of vehicle parking. More specifically, the present invention relates to a fully automated parking system.

BACKGROUND OF THE INVENTION

Automated parking systems are in use in closed parking lots where the vehicle is registered and identified at the entrance and at the exit barrier where the driver uses a remote control device for opening and/or closing of a barrier, and he is charged for the parking later on.

However, this is not the case with on-street parking systems. On-street parking systems must be accompanied with a payment means of some sort, such as a parking meter, paper vouchers, in-car meter, mobile means, etc.

Also, the technology of informing the public about the occupancy of on-street parking spaces is already known, and is in use in various locations. The common denominator of all these means is the need of the driver to perform specific actions at the beginning of the parking period and sometime also at the end of the parking period. Such means and actions are inconvenient to the driver, and expensive to the parking authorities.

The most popular type of parking system is the traditional parking meter or the more advanced Pay & Display machine (also known as multi-space meter). However, this parking meter impose many disadvantages for the motorist who is forced to carry coins, has to decide in advance for how long parking time to pay, he cannot be refunded in the case of a shorter parking period, and he in some cases he has to walk a long distance to the meter and back to his car.

From the point of view of the authorities, a system of parking meters involves a significant investment in infrastructure, particularly for installing on-street facilities, for maintaining them, for collecting the parking fees, for controlling the parking zones, and for enforcing the parking regulation.

Even the most advanced parking systems, which are based on a cellular (mobile) phone communication, still involve certain operational costs for both sides. The motorist must make two phone calls for the activation and termination of the parking session and he may often forget to terminate the session. The motorist must also inform the call center about his parking location, city, street or zone of which he often doesn't know all these details. In many occasions the user activates the parking session in zones or on times where his vehicle is not allowed to park (residential areas for instance). In such cases, (that are quite often), the parker is charged for the parking time and receives a ticket in addition for violating the regulations. Most of the known cellular parking systems are not able to control the specific location of the parker and prevent such inconveniences. As for the authorities, the inspection of the cellular parking system involves the use of dedicated and expensive terminals and/or cameras that use the LPN (License Plate Number). The use of these means doubles or even triples the enforcement manpower required for enforcing the cellular parking system compared to the traditional systems.

Another disadvantage of the cellular system is caused by the difficulties to operate and control a diversification of specific parking regulations per each particular zone at any given time, which is very commonly used by municipalities.

Still another disadvantage of the Cellular Parking System results from the fact that the user can easily extend the parking session beyond the time limit in a way the authorities are not able to control. For example, if a specific parking zone allows parking for a maximum period of two hours, at the end of the two hours the parker can call the Host to extend the parking. The authorities cannot verify whether the parker has moved his car to another parking space within a same zone (and in that case the latter parking is valid), or alternatively whether he just extended the parking without moving the car, i.e., while staying in a same parking space (and in that caser the parking is illegal).

An ordinary motorist, who considers the on-street parking as his basic right and could hardly agree to pay for it, doesn't like to be bothered with complicated and inconvenient payment procedures. In view of the above complications the authorities only "add fuel to the fire" and they are finally forced to spend significant expenses for the enforcement.

It becomes obvious that the more we facilitate the parking procedure for the motorist, the less the authorities have to spend on enforcement. Thus, a friendly parking system serves above all the interest of the parking authority.

US 2006/0152349 and U.S. Pat. No. 6,493,676 disclose parking systems that suffer from at least several of the drawbacks listed above.

It is an object of the present invention to provide an automated parking system where the motorist does not have to perform any action before, during or after the parking session.

It is still an object of the present invention to provide an automated parking system where the need of the motorist to provide information such as zone number, city, address, etc., which is usually required by cellular parking and in-car parking systems is eliminated. More specifically, it is an object of the invention to provide a system where the parking fee is automatically charged at the bank or credit account of the motorist at the end of each month.

It is still another object of the present invention to provide an automated parking system where the need of the authority to employ manpower for patrolling the parking streets is significantly reduced. Specifically, it is an object of the present invention to provide a system which automatically reports parking violators in real time, including the exact location of the violating car, while only suspected cars are attended by the inspection.

It is still another object of the present invention to provide an on-line updated in real time database which stores indications with respect to the occupancy of each and the entire parking spaces, thereby enabling providing on-line information to the public on locations of free spaces.

It is still an object of the present invention to provide a system which eliminates the need for installing expensive equipment on sidewalks, which is often subjected to vandalism, weather, and traffic damages in addition to their unaesthetic appearance and occupation of space. More specifically, it is an object of the invention to save over 75% of the equipment investment per parking space, while providing unseen elements along the parking streets and the sidewalks.

It is still another object of the present invention to provide a system which is essentially maintenance-free, with almost no operational costs.

It is still another object of the present invention to provide a most reliable and enforceable system for preventing any attempt to extend the duration of a parking session beyond its legal time limit.

It is still another object of the present invention to provide a reliable and enforceable system for controlling in real time any kind of misuse of classified or dedicated parking spaces such as residential or handicapped by unauthorized vehicles.

It is still another object of the present invention to simplify and improve residential and permit parking management.

It is still another object of the invention to provide the advantages of the present invention either when the parking car has a dedicated in-car device or when he does not have a parking device, while the car driver uses a cellular phone for paying the parking fees.

It is still another object of the invention to enable an automatic termination of the parking session at the moment when the car has left the parking space, even when the parking car is not provided with an in-car device. More specifically, the automatic termination of the parking space can take place even if the driver of the parking car has used his Cellular Phone to initiate his parking session. This is in contrast to the conventional cellular parking system where the user has to call a dedicated call center to inform termination of the parking. Moreover, the Host of the system can verify that the car has indeed left the parking space, in contrast to the cellular system where the such a verification cannot be remotely made.

It is still another object of the invention to send a warning signal to a Cellular parker in case he approaches a parking space where this vehicle is not allowed to park, either absolutely or during this specific time of the day.

It is still another object of the invention to reduce the relatively high enforcement costs of the Cellular Parking System by integrating it to the significant less expensive enforcement method of the present invention of the Automated Parking System.

It is still another object of the invention to enable the authorities to precisely enforce the parking time limits even while a Cellular Parking is system is used.

It is still another object of the present invention to provide a system for locating stolen cars, suspected cars, or cars that have not paid parking tickets issued to them.

It is still another object of the present invention to provide the parking driver with the option of receiving the exact location of his parking vehicle in case he forgot it.

It is still another object of the present invention to provide an automatic system for controlling the use of dedicated parking lots such as residential or handicapped lots, while differentiating between authorized and unauthorized parking cars.

Other objects and advantages of the invention will become apparent as the description proceeds.

SUMMARY OF THE INVENTION

The present invention relates to a parking system, which comprises: (a) plurality of Curb Devices, each Curb Device having its own unique Curb Device ID and is installed close to a corresponding parking space; (b) plurality of Car Devices, each Car Device is provided with its own unique Car Device ID, and is positioned at a corresponding car at a location which is visible from the outside; (c) a Host which is provided with Users Data and Parking Spaces Data, for remotely managing, billing, enforcing and controlling on line and in real time parking of vehicles at each of said parking spaces; wherein: (A). each Curb Device further comprises: (A.1) a sensor for sensing coming and leaving of a vehicle within the respective parking space and providing indication accordingly to a controller of said Curb Device; (A.2) a Short Range RF Curb Device transceiver; (A.3) a Long Range RF Curb Device transceiver; and (A.4) a Curb Device Controller for: (–) upon sensing the approaching of a vehicle to the parking space, sending an interrogation signal to the Car Device of said vehicle by said Short Range RF transceiver; (–) in response to said interrogation signal, receiving the ID of the Car Device, and forwarding request for parking to the Host via its Long Range RF transceiver, which includes said ID of the Car Device and the Curb Device ID; (–) receiving from the Host an approval for the parking signal, approval for a limited time parking signal, or denial of the parking signal, and forwarding the same to the Car Device; and (–) upon sensing leaving of the vehicle of the parking space, sending an end of parking signal to the Host; (B). each Car Device further comprises: (B.1) Short Range RF Car Device transceiver for communicating with a Curb Device; (B.2) lighting means for giving a visual indication from the exterior of the car, for a valid parking or invalid parking; (B.3) a Car Device microcontroller for: (–) receiving said interrogation signal from a Curb Device via said transceiver, and sending in response said ID of the Car Device; (–) upon receipt of approval from a Curb Device, initiating a parking session during which a clock is activated for counting the period of the parking, while further providing said valid parking visual indication, or upon receipt of a non-approval for a parking from a Curb Device, providing said invalid parking visual indication; and (–) at the end of a parking period, terminating said clock; (C). the Host further comprises: (C.1) a Users database which stores for each Car Device a User Data Record, which details at least the ID of the Car Device given to that user, the License Plate of the car to which the Car Device has been assigned, and personal details (including credit card or bank account) of the Car Device user to which said Car Device has been assigned; (C.2) a Parking Spaces database which stores for each Parking Space a Parking Space Record, which details at least the regulations applied for this specific Parking Space, and the cost per minute of parking in said parking space; and (C.3) a control unit for: (–) upon receipt of said request for parking from a Curb Device, and having the Curb Device ID and Car Device ID, comparing the corresponding user data record with the corresponding Parking Space Record, and in the affirmative case, issuing approval for the parking signal, approval for a limited time parking signal, or a denial of the parking signal, and forwarding to said Curb Device, and further, initiating a parking session for this request if said approval was issued; and (–) upon receipt of an end of parking signal from the Curb Device, terminating the parking session, counting an accumulated charge for the parking, and billing said user.

Preferably, the Car Device further comprises an accelerometer, for activating the transceiver of the Curb Device when the car is stationary.

Preferably, said termination of the parking session at the Car Device occurs when said accelerometer is reactivated after an active parking.

Preferably, during a parking session a confirmation signal is sent periodically from the Curb Device to the Car Device, and wherein the Car Device maintains the parking session as active as long as it receives said confirmation signal, while terminating the session when ceasing to receive this signal.

Preferably, termination of a parking session occurs at the Car Device when it ceases to receive a request for confirmation signal.

Preferably, the Car Device further comprises a memory for recording details relating to plurality of concluded parking sessions.

Preferably, the enforcement by an inspector is performed by: (A) an inspector sending license plate number of a suspected car to the Host; (B) the Host, given said license plate number, retrieves the Car Device ID which corresponds to said license plate number, and further verifies the validity of present parking by said Car Device; and (C) the Host, in the case that said verification shows a present valid parking, further sends a Valid Parking signal to the respective Car Device via the Curb Device which corresponds to said present valid parking; and (D) the Car Device, upon receipt of said Valid Parking signal, illuminates said lighting means in a predefined manner to indicate to the inspector that the parking is valid.

Preferably, the Host further provides to the public real time notifications on availability of one or more parking spaces via public signs, or via mobile devices.

Preferably, one Curb Device manages plurality of simultaneous parking sessions by plurality of Car Devices.

Preferably, the antenna of the Curb Device is a directional antenna.

Preferably, the range of communication by said short range RF communication is up to 10 meters.

Preferably, the Curb Devices are hidden below a layer of concrete or asphalt, or installed on the surface of the asphalt, or above the Curb.

Preferably, the Curb Device unique ID number (or symbol), is displayed on the surface, either by dedicated signs or painted on the pavement.

Preferably, the Curb Devices are battery operated or main electricity operated.

Preferably, the Curb Device stays partially at a sleep mode to save battery energy.

Preferably, the lighting means at the Car Device uses first color LED for valid parking, and a second color LED for invalid parking.

Preferably, the Car Device further comprises an LCD display for displaying to the user one or more of information relating to an active parking session, reasons for invalidity or non-approval of parking, limitations to approved parking session, or older saved parking sessions.

Preferably, the system of the invention can also be used for Cellular Parking by a driver of a parking car which is not provided with a Car Device, wherein: the Users database stores for each car a User Data Record, which details at least the user's cellular phone number, the License Plate of the respective car, and personal details of the cellular phone user of that car including payment means; the ID of the Curb device, is visually displayed; the car driver requests initiation of a parking session by sending a message to the Host which includes the Curb Device ID, whichever is the case; a message with respect to the validity of parking and possible initiation of a parking session is sent back to the user's cellular phone; and the termination of the parking is automatically determined by means of said Curb Device sensor, which senses that the respective car has left the parking space, and by said Curb Device sending a respective message to the Host.

DETAILED DESCRIPTION OF PREFERRED EMBODIMENTS

Figure 1:
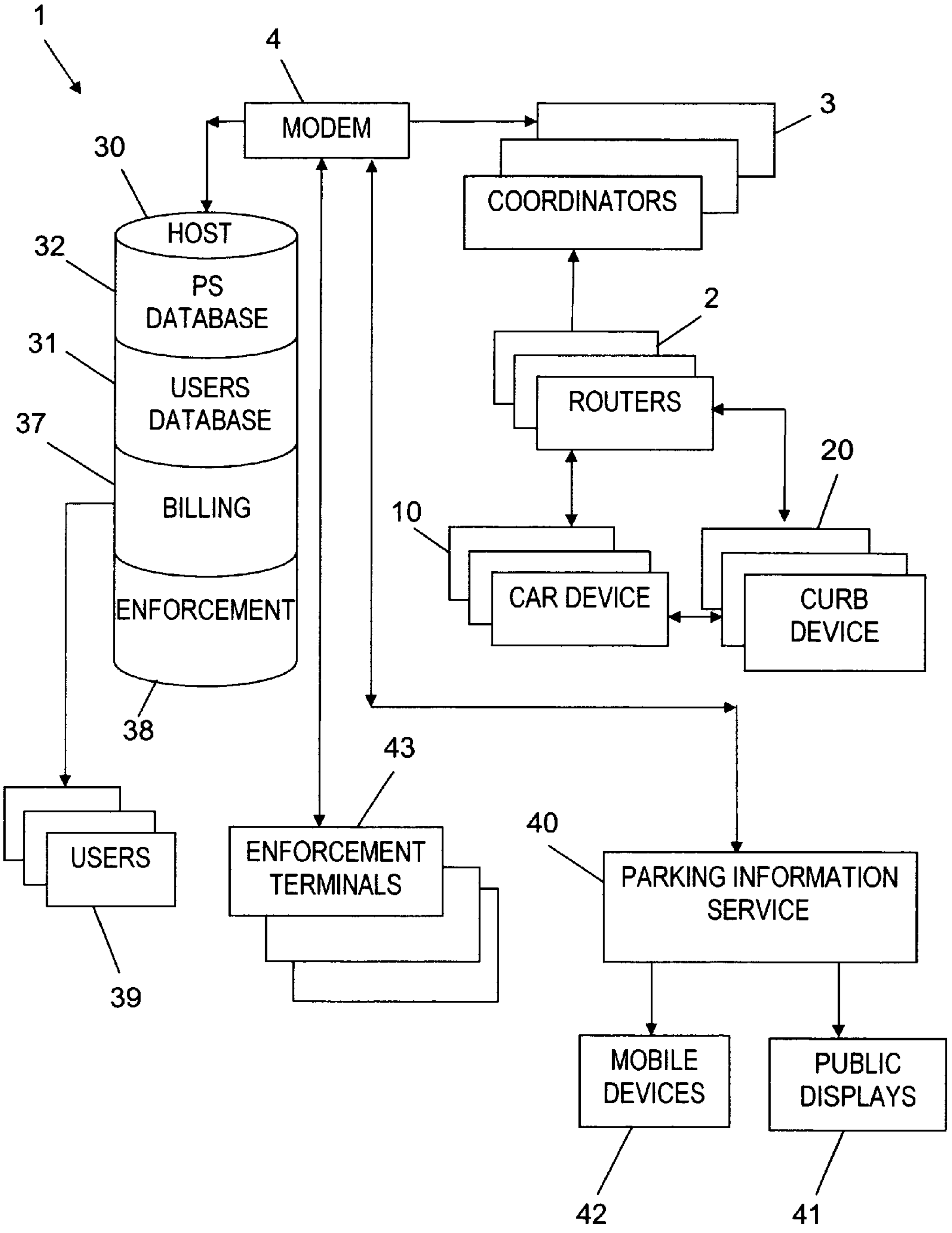
FIG. 1 is a block diagram illustrating the general structure of the parking system of the present invention.

FIG. 1 is a general block diagram which illustrates the basic structure of the parking system 1 of the present invention. The system 1 mainly comprises plurality of Car Devices 10, each positioned within a corresponding vehicle, plurality of Curb Devices 20, each positioned within a parking space, a back-end control center 30, (hereinafter also referred to as Host) and a communication network.

The Control Center 30 performs management of the system. More specifically, Host 30 has a Parking Space database 32 which stores all the relevant parking regulations per each parking space per any given time, and Users Database 31 which stores individual users (subscribers) data. The Host performs processing of the system, billing of all the individual users, it manages the enforcement, and it also performs additional functions that will become apparent hereinafter. As mentioned, each vehicle is provided with one Car Device 10. Each parking space is provided with a Curb Device 20, which is in turn installed beneath or above the concrete or asphalt, or along the curbs of the sidewalk at each parking space. As will be explained in more detail hereafter, one Curb Device 20 may be common to one or even two parking spaces. The parking system 1 of the present invention maintains real time information with respect to the occupancy of each individual parking space within the system, and moreover, with respect to the legality of parking in each individual parking space. Therefore, having this knowledge, the parking information service 40 can output real time occupancy information to public displays 41, or to mobile devices 42. As will be demonstrated hereinafter, this information can be provided with respect to any individual parking space, in order to assist the public to find a parking space in an easier and more efficient manner. The control center also comprises a billing unit 38, enforcement unit 37, and mobile enforcement terminals 43. The users of the system (i.e., the car drivers) are marked 39.

Figure 2:
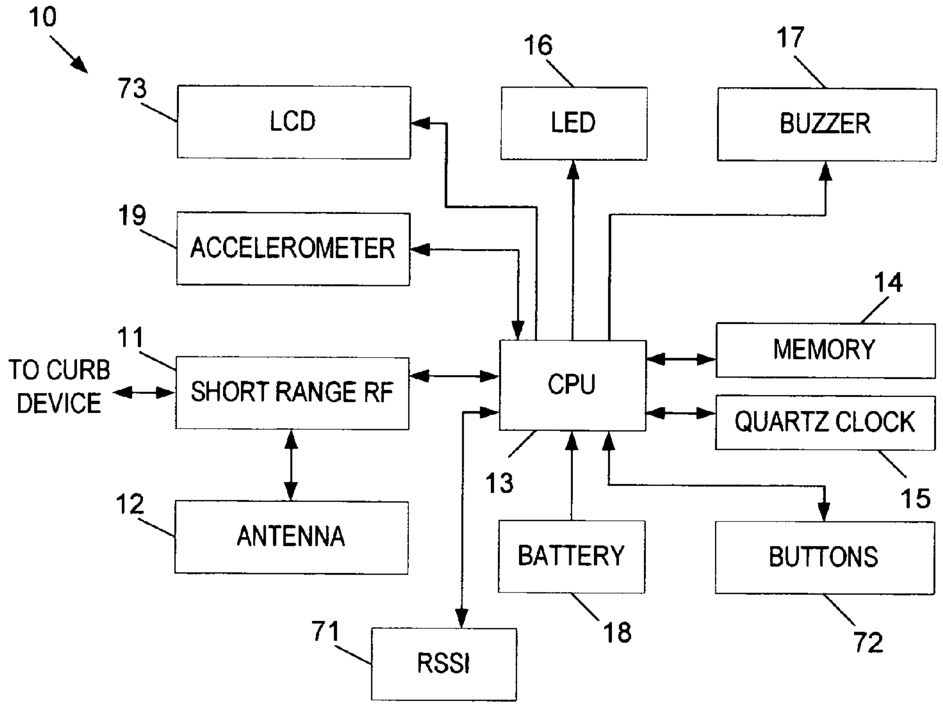
FIG. 2 is a block diagram illustrating the general structure of the Car Device.

FIG. 2 illustrates in a block diagram form the general structure of Car Device 10. Car Device 10 is positioned within the car, typically attached to the windshield window in a manner that its coloured lights, preferably green and red lights (described hereinafter) are seen through the window. The Car Device comprises the following main components:

a. A Short Range Radio Frequency (SRRF) transceiver 11 and an appropriate antenna 12, for communicating with Curb Device 20, when approaching the parking space.
b. A Microcontroller (CPU) 13 for operating the device, including an embedded non volatile memory unit 14.
c. A quartz clock 15;
d. At least one LED indicator 16. Preferably, two indicators (or one bi-color led indicator) of two colors, such as green and red are provided;
e. An optional LCD display 73 for enhanced features, such as displaying messages from the host, displaying time limit, tariff, parking availability at a particular place and time, unpaid tickets, or any other personal information.
f. An optional buzzer 17 which may come in addition to the LED 16, or in some case it may even replace LED 16;
g. Battery 18;
h. An optional, however very preferable, accelerometer 19 for ensuring activation of communication with a respective Curb Device 20 only when the car is stationary. This feature increases reliability of the system, as it ensures (together with the sensor of the Curb Device 20, as will be elaborated hereinafter) that no activation of a parking session occurs, unless the car really parks within the respective parking space;

i. Optional RSSI algorithm (component) 71, which reduces errors due to erroneous communication with multiple Curb Devices. Specifically, if due to erroneous situation the Car Device receives communication from plurality of neighboring Curb Devices 20, the RSSI (Receive Signal Strength Indication) algorithm ensures consideration by the Car Device of only the strongest one;

j. Optional one or more buttons 72, for operation of the device, for example, ONN-OFF button, or other buttons for placing the mode of the device or its display.

k. A plastic casing l. An appropriate attachment means for attaching the device to the windshield.

Figure 3:
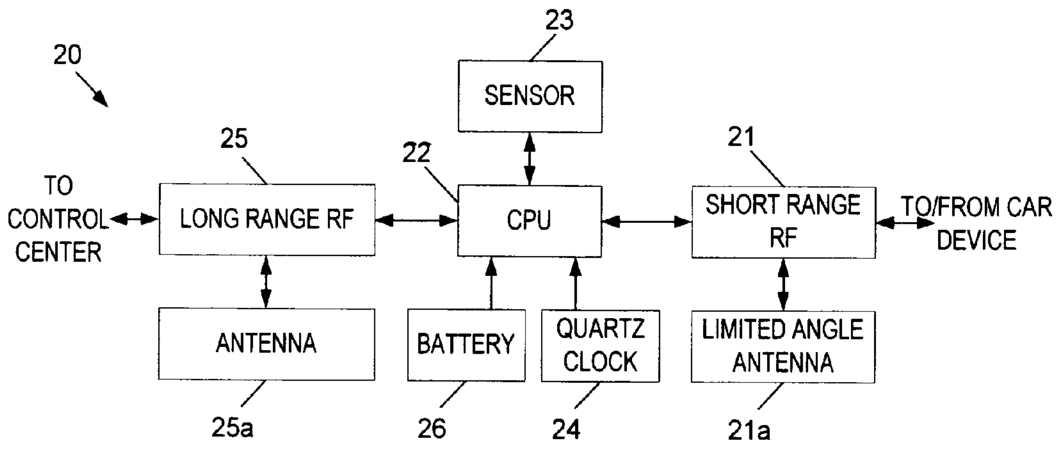
FIG. 3 is a block diagram illustrating the general structure of the Curb Device.

FIG. 3 illustrates in block diagram form the structure of Curb Device 20 according to an embodiment of the invention. Each Curb Device 20 has a unique ID, and comprises a short range RF transceiver or RFID transceiver (hereinafter "SRRF") 21 and antenna 21*a* for communicating with Car Device 10, a microprocessor (CPU) 22, an RF longer range transceiver (hereinafter "LRRF") 25 and antenna 25*a* operating in a protocol such as Zigbee, Bluetooth, cellular, WiFi, or the like for communicating with the Host (for example, via one or more of routers 3, coordinators 4, modems 5 (see FIG. 1), etc. or via mediators such as other Curb Devices 20). Curb Device 20 also comprises a Sensor 23, preferably a magnetic sensor for sensing that a vehicle has parked within the respective space, and a clock 24. In one option, a single RF communicator handles both the long range and the short range communication, using well known broadcasting technologies. The magnetic sensor 23 is always ON to sense a parking vehicle as soon it enters to the respective parking space or leaves the space. The transceiver of the Curb Device typically stays at a "sleep mode" and it is activated by an interrupt when received from the magnetic sensor 23 or by the controller.

In one alternative, Curb Device 20 is connected to the electricity network and to a telephone network. In another alternative, Curb Device 20 is an independent unit which is powered by battery 26 and communicates wirelessly with the Host 30. In still another alternative, Curb Device 20 is connected to the main power and communicates by network cables with the host 30.

When a motorist (i.e., "user") registers to the parking system, the user submits his personal details, and at the same time he receives a Car Device. A User Data Record (UDR) is created at the Users Database 31 of Host 30, which comprises:

a. Car license number (i.e., License Plate number (hereinafter "LP");

b. Car Device ID. It should be noted that the Car Device is given to a specific car, and only the host can match between the Car Device ID and the User Data Record (UDR);

c. The motorist address, which is optionally used for two purposes, as follows: (i) for sending future bills, parking receipts, or parking reports; and (ii) optionally when applicable, for determining eligibility for residential parking;

d. Special User Eligibility (hereinafter "UE") details, such as optional eligibility to handicapped, subscriber, student, or another special tariff;

e. Eligibility to Special Car (SC) tariff, such as public car tariff, emergency car tariff, etc.;

f. User bank details for charging the parking, and/or credit card details, etc.; and g. Optionally the user cell phone number for enabling advanced customer services.

Figure 4:
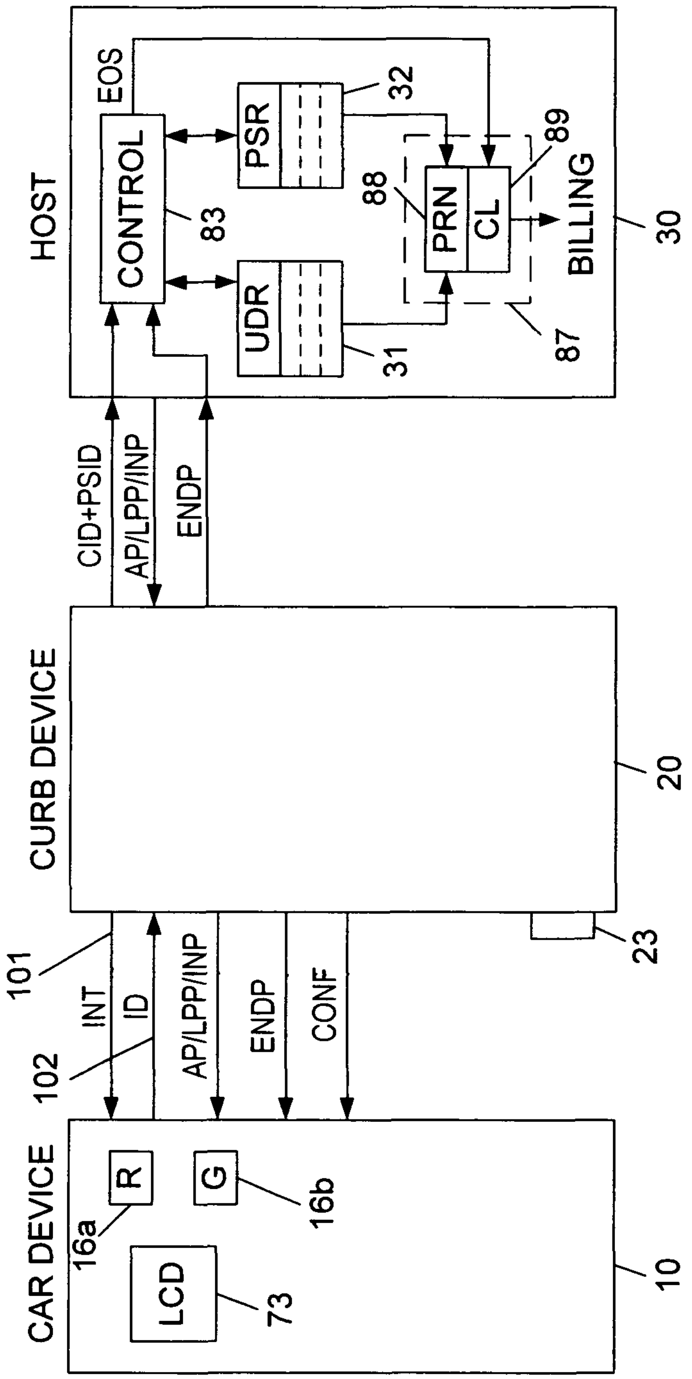
FIG. 4 illustrates the flow of the signals between the Car Device, the Curb Device, and the Host.

Host 30 also maintains a Parking Spaces Database 32 (hereinafter PS Database) for all the various parking spaces. More specifically, PS Database maintains a Parking Space Record (hereinafter (PSR) for each specific parking space. Each PSR comprises one or more of the following data:

a. One or more tariffs for parking per minute in this specific parking space, optionally divided into different times during the day, the day of the week (or holidays) and eligibility conditions;

b. One or more tariffs for subscribers;

c. One or more tariffs depending on User Eligibility;

d. One or more tariffs for Special Cars (SC);

e. Maximum continuous parking period for one parking session, optionally various values for different times of the day/holidays;

FIG. 4 illustrates the procedure of parking of a vehicle having a Car Device 10 at a parking space having a Curb Device 20. Sensor 23 of Curb Device 20, is always ON for determining whether a car comes to within the parking space. As mentioned, sensor 23 may be, for example, a magnetic sensor, which can easily determine a proximate car due to its mass ferromagnetic material. Upon sensing by sensor 23 the placement of a car within the parking space, Curb Device 20 initiate transmission of an SRRF (short range RF) interrogation signal 101. Preferably, but not necessarily, the interrogation signal contains the ID of the Curb Device. This interrogation signal 101 is received at Car Device 10, which in turn responds by transmitting its ID 102 to Curb Device 20. Curb Device 20 forwards the Car Device ID (CID), together with its own Curb Device ID (Parking Space identification PSID) to the Host 30. As previously mentioned, Host 30 maintains two databases, Users database 31, and Parking Spaces database 32. The control unit 83 uses the Car Device ID (CID) to find within database 31 the specific UDR (the specific user data record) and uses the Curb Device ID (PSID) to find within the Parking Spaces database 32 the specific PSR (the parking space record which refers to this specific parking space). The control unit 83 compares the specific UDR against the specific PSR, and issues one of three signals which is sent back to the Curb Device 20:

a. Signal AP (Allow Parking). This signal is sent to the Curb Device 20, which in turn forwards it to Car Device 10 when the parking is found valid;

b. Signal LPP [maximal time] (Limited Period Parking+the maximal time which is allowed for parking). This signal is sent to the Curb Device 20, which in turn forwards it to the Car Device 10 when the parking is found valid, however only for a limited period;

c. Signal INP (Invalid Parking). This signal is sent to the Curb Device 20, which in turn forwards it the Car Device 10 when the parking has been found as not to be allowed for this user. In some cases, In the two first cases above, an active parking session is also opened, which comprises a Parking Per Minute (PPM) value which is determined by said comparison between the UDR and PSR, and activation of a Clock 89. In the last, invalid parking case, only the signal INP is sent to the Curb Device 20. Curb Device 20 forwards the signals to the Car Device 10, which provides an appropriate display to the user. For example, if a signal AP is received at device 10, Green light 16*b* may be activated, indicating a successful initiation of the parking session. If a signal LLP is received, again Green light 16*b* is activated, while displaying to the user on display 73 the maximal parking period allowed for this session. If a signal INP is received, a red light 16*a* is activated, indicating that the parking is found as invalid, and that no parking session has been initiated. Optionally, a message relating to the reason for the invalidation of the session may be also provided on display 73.

Upon activation of the parking, the green LED 16*b* may blink 3-4 times to confirms the driver that the parking has been started, and that the parking is valid. Alternatively, a buzzer may sound several times for informing the same. LCD 73 may also display to the driver certain information such as time limit, parking rates, etc. or even personal massages to the car owner like unpaid tickets, etc. The green light 16*b* of the Car Device may remain ON or blink as long as the parking session is valid. In the case that the valid parking is limited in time (as provided by the maximal time attached to the LLP signal, a timer is set at the device accordingly. At the end of this time, green light 16*b* turns OFF, and red light 16 turns ON to indicate an invalid parking. Simultaneously, at the Host clock 89 is reset, and the parking session is terminated. If the vehicle remains at the parking space at the end of the maximal time, the parking becomes invalid. The Host can easily determine such a situation, as the sensor 23 continues of the Curb Device 20 continues to report that the space is occupied even when the maximal time has passed. In contrast to systems of the prior art where the user can merely return to his car, add some payment, and extends the parking session beyond the original maximum time, the system of the present invention is the only one which controls such a situation by means of sensor 23, and can easily determine whether the car was removed from the parking space before the maximal time or not. The system of the present invention is therefore advantageous, as it enables enforcing the user to remove his car from the parking space at the end of the maximal time, or otherwise be punished. Specifically, if the car continues to park beyond the maximal time, the enforcement staff can be sent by the host to issue a ticket to the car.

The end of the session occurs when the sensor 23 of Curb Device 20 senses that the car has left the parking space. In that case, Curb Device sends an EndP (End of Parking) signal to Host 30. The Host 30, in turn, upon receipt of signal EndP by its control 83, terminates clock 89 by sending an EOS (End of session) signal, and calculates the total parking charge by multiplying the total clock duration (in minutes) by the PPM charge (parking cost per minute). The result of this calculation is forwarded to a billing department which in turn charges the user for the parking in a conventional manner (such as credit card, sending of monthly bill, deduction of the parking charge from the user bank account, etc.).

As noted above, the sensor of the Curb Device 20 can provide an indication for the end of parking, (i.e., when the sensor ceases to sense a car within the parking space). In a first alternative, the accelerometer of the Car Device provides to the Car Device the indication relating to the end of parking. More specifically, when the accelerometer of the Car Device senses movement of the car, issues an indication within the Car Device of the end of parking.

In a second alternative, also Car Device 10 activates (upon receipt one of signals AP or LLP) a clock to count the parking duration. Curb Device 20 repeatedly sends verifications signals to Car Device 10, which in turn uses these signals for automatically determining whether Device 10 is within a parking space (i.e., within the effective range of the SRRF signals of the Curb Device), and in that case the parking session is in progress, or it is out of the parking space and in that case the parking session should be terminated, and the Car Device should return to "standby" mode. Said verification signals are sent at a high rate, typically at a rate higher than once every 1 minute. As long as Car Device 10 receives said verification signals from the Curb Device 20 (in said SRRF channel), Car Device 10 knows that it is within the parking space. At the moment that the Car Device ceases to receive the verification signals, it terminates its parking session clock, and records the date, time, the Curb Device ID (or even the exact location if received from the Curb Device), and the parking session duration within its internal memory for possible future verification. Preferably, the Car Device memorizes at least the last ten parking events to provide a legal evidence for the driver in case he gets a wrong ticket.

As described above, Host 30 opens a parking session for each valid parking. However, there may be cases where a vehicle parks within a parking space, without successful activation of a valid parking session, or even without having a Car Device at all, or in some cases, upon payment for the session through other payment channels. In any of those cases, the host can determine for each specific parking space whether the space is occupied, or free for parking. More specifically, if a parking session is active, the Host knows that the space is occupied. For those other cases where a car parks within a parking space in an invalid manner, the sensor 23 of Curb Device 20 provides an indication respective Curb Device, which in turn forwards it to the Host. Such a report from the Curb Device 20 to the Host 30 is performed periodically, enabling the Host to know at any given time in real time the status (i.e., occupied—valid parking, invalid parking, or suspected parking—or not occupied). This knowledge is used by the host for two purposes, (a) enforcement; and (b) notification to the public where free parking spaces are located.

There are various manners by which an invalid parking can be determined by the system, as follows:

a. A case where a car parks beyond the maximal time: it has been described above how the Host can determine in real time and handle such a situation. There are various ways by which fine to the user can be applied: (a) the enforcement can send a riding inspector to the parking space in order to issue a ticket; or (b) an increase on the PPM (parking per minute) cost may be applied as a fine.

b. A situation of "normal" invalid parking can be easily determined by sensor 23 and reported to the Host, When Curb Device 20 Reports to the Host that a parking space becomes occupied, while no valid parking session is initiated (for some reason), the Host can immediately conclude that the parking is invalid, and the enforcement may be set to the car.

c. Prevention counterfeiting of a device to falsely show a green light, as a false indication for a valid parking: While parking at a specific parking space, sensor 23 reports an invalid parking, and an enforcement inspector is dispatched to the car. He sees a Car Device 10 with a green LED lighting. The inspector can verify the authenticity of the device by sending an SMS to the Host using his cellular phone indicating license plate number of the suspected car. The Host verifies in its active sessions and using the users database whether the car is presently parking (i.e., its device ID is actively during a parking session). If so, the Host has in its possession the ID of the Curb Device which is presently in communication with this suspected Car Device. In that case, the Host sends an authentication signal to said Curb Device, which in turn forwards the authentication signal to the Car Device. If the suspected Car Device is authentic, the authentic signal causes the green light to blink several times as an indication for a valid parking of an authentic Car Device. If the green light of the Car Device does not blink, this is an indication for a counterfeit device. It should be noted that there is no way by which the green light of the Car Device can blink several times at the appropriate moment of inspector verification, unless the device is authentic and it is during a valid parking.

d. A case where a user who is eligible for extended rights (such as subscriber, handicapped, resident, etc.) gives his Car Device to another driver, who places the device within his own car, in a try to falsely benefit from said extended rights. Again, as in the previous case, an enforcement inspector who suspects a specific car may send an SMS indicating the license plate number of the parking car to the Host, again asking for an authentication signal. The authentication signal will be sent to a Car Device ID which "matches" the registered license plate. As the Car Device is not located within the car for which the device was issued, obviously the returned signal to the device will not cause blinking of the green light. Therefore, also in this case the inspector can verify and detect this type of counterfeit.

Figure 5:
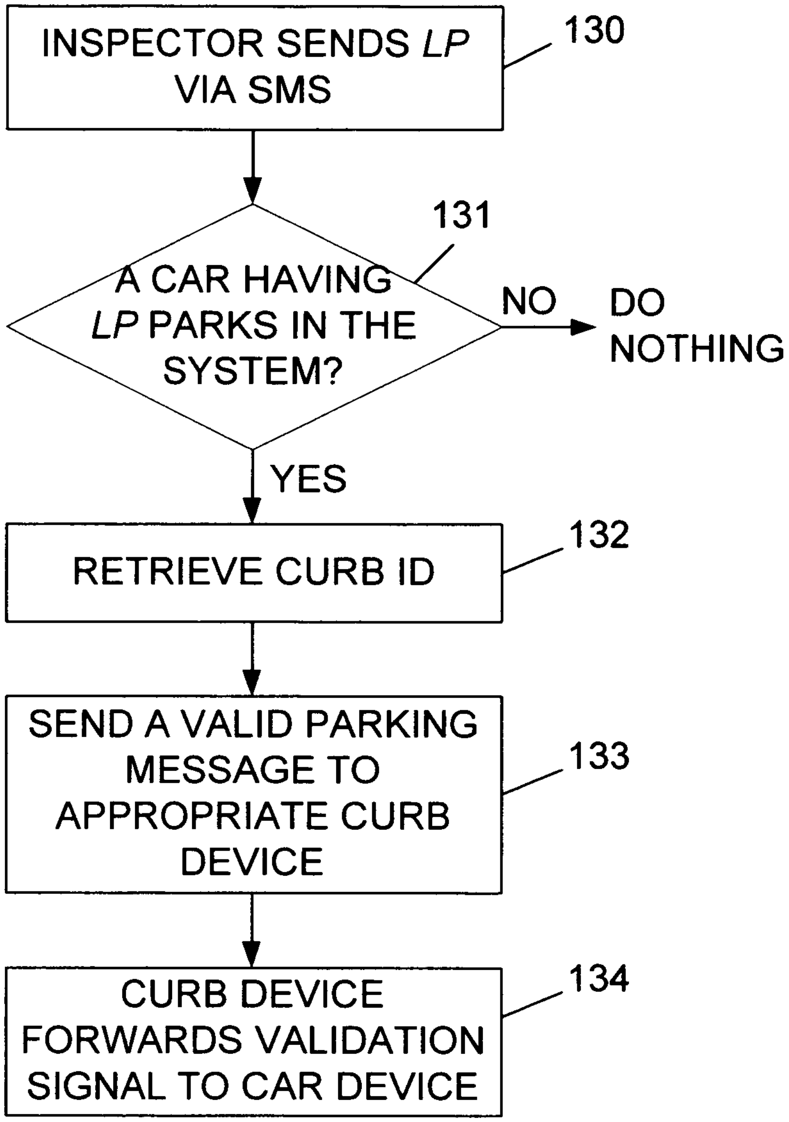
FIG. 5 is a flow chart which illustrates the manner by which an enforcement inspector verifies the validity of parking of a vehicle.

FIG. 5 is a flow diagram illustrating the verification operation which is performed by the enforcement inspector, and which is applicable to the cases above. Assuming, that an inspector suspects the validity of parking of a car having a Car Device, he sends in step 130 the LP (license plate) number of the suspected car to the host, for example by means of an SMS message. In step 131 the Host 30, which receives the SMS message, checks in its real time database whether a car having said specific LP parks in the system. If not, the Host 30 do nothing, or is ends an SMS message back to the inspector stating that presently there is no valid parking found for this specific car. The inspector may issue a ticket to the car for an invalid parking. If, on the other hand, the Host finds (by use of this specific LP number) in its real time database that this car indeed recorded as parking, the Host retrieves in step 132 the corresponding ID of the Curb Device where the car parks, and sends in step 132 a "Valid_Parking" message to this specific Curb Device 20. The Curb Device, in turn, forwards in step 133 the "Valid_Parking" message to the corresponding Car Device 10. The Car Device 10, in turn, upon receipt of said "Valid_Parking" message issues a visual signal to the inspector, for example, a blinking of the green light which is visible to the inspector through the windshield. In addition to sending the "Valid_Parking" message to the Car Device 10 via the Curb Device 20, the system in one embodiment also sends the result of the parking validation verification to the mobile device of the inspector by means of an SMS.

As described above, the Host has in its possession continuous and real time knowledge regarding the status of all the various parking spaces. This knowledge exists whether the parking space is legally occupied (i.e., by payment of parking fees) or not. This is because this knowledge comes from the Curb Device sensor which does not differentiate between valid or invalid parking sessions. Having this continuously updated knowledge base, the Host may provide notifications to drivers where free parking spaces are located. For example, these notifications may be provide over street public displays, sent to individual cellular phones, etc.

An algorithm within the Curb Device and the Car Device is preferably provided for eliminating communication errors. One type of error may be a case where two Car Devices respond to one interrogation by a Curb Device. Another type of error is the case where a Car Device wrongly responds to a Curb Device interrogation, while the car is located in another car space. Still another type of error may be when two Curb Devices interrogate a single Car Device. For eliminating the errors, the Curb Device SRRF conveys its ID while sending the interrogation signal to the Car Device of the parking vehicle. The Car Device transmits its own ID, and only the appropriate Curb Device (who originally sent the interrogation) will process this response. Elimination of the case where two Curb Devices interrogate a single Car Device may be obtained by adding an RSSI algorithm (or similar means) to the Car Device receiver. Based on this algorithm, the Car Device selects the nearest Curb Device (i.e., the one having a stronger signal) for responding only to it. It should be noted that typically the short range communication between the Curb Device and the Car Device is adjusted to operate at a very short range, typically not less than about 3 meter and up to about 10 meter. Such an adjustment of the short range communication can also help in eliminating communication conflicts. Still another manner which prevents conflicts is the use of a limited angle antenna, in a manner known in the art, which directs the Curb Device signal to a location where the Car Device is expected, and avoids radiation or reception from other directions.

The Car Device accelerometer 19 is designed to distinguish between a moving vehicle and a stationary vehicle. The accelerometer prevents communication by the Car Device as long as the car moves. More specifically, the Car Device preferably remains in a sleep mode as long as the car moves. This feature very significantly saves power consumption of the battery operated Car Device 10. This feature also prevents false activation of the parking session while the car passes close to an empty parking space which is equipped with a Curb Device.

The buttons 72 of the Car Device 10 provide additional options such as:

a) Saving battery power by manually turning ON of the Device only when parking. The Car Device may be turned OFF for saving battery if the car is expected to be away from the city for a long period.

b) Preventing charge by turning OFF the Device when stopping the car while the driver stays in the car, when stopping for a short period next to the Curb to load or unload passengers, or when the car is jammed by traffic close to a Curb Device.

The Car Device 10 is simple and inexpensive. Thus, it will not become a subject for burglary. However, if a car is reported as stolen, its device will is removed immediately from the system, to prevent charge from the real owner. In addition, in order to protect the privacy of the owner, the device contains only a serial number and nothing else that can disclose any personal information of the owner.

Curb Device 20 is essentially maintenance free, preferably protected and covered by concrete or asphalt, or being located within a metal covered cell, where the metal cover may be used as an antenna, particularly for longer distances (when desired). In the case of battery operated Curb Device, the batteries are expected to last typically at least 5 years. The Curb Device can be installed beneath the asphalt as close as possible to its surface. In an embodiment of the invention, one Curb Device 20 may serve more than one parking space. This alternative saves devices costs on one hand and eliminates the need for marking the borders of each parking space.

The system of the present invention may likewise operate with cars that do not have a Car Device. In that case, the driver of the parking car can use his cellular phone as an alternative of the Car Device. As before, the driver has to register to the system, while providing his User Data Record as before. However, instead of his own Car Device ID, the user's data includes his cellular phone number (which in this case represents his car ID). The unique Curb Device ID is visually displayed next to the parking space.

As mentioned, in the conventional cellular parking system, the pre-registered motorist calls the operator (a Host which is operated via a "Call Center") twice by his mobile phone in order to initiate the parking session and to terminate it when he leaves the parking space. While initiating the session, the motorist has to provide his parking location, which is normally limited to the name of the city or zone, while the city, which usually operates a variety of tens different zones characterized by different tariffs and other local regulations is generally divided to no more than 1 or 2 zones due to the cellular parking limitations.

According to this alternative of the invention, in order to initiate a parking session, the motorist calls the Host or sends an SMS which indicates the visually displayed ID of the Curb Device, which is shown next to the Curb Device. The system treats the cellular message with the user Cellular Phone Number and Curb ID in a same manner as described before with respect to the Car Device alternative (where the manner for identification of the specific car and specific parking space uses the Car Device ID and Curb Device ID respectively. If the parking is found to be valid, a cellular message may be returned to the cellular phone of the driver, notifying him the beginning of the parking session. Otherwise, if the request for parking is found to be invalid to this particular car at this specific location or time, a respective message may be returned to the cellular phone of the driver notifying him the same. The Curb Device sensor verifies the location of the parking vehicle, and determines the end of the session for billing purposes (as before, such information as determined by the sensor is communicated from the sensor of the Curb Device to the Host). This is in contrast to the case of the conventional cellular parking system where the user has to call the Host again at the end of the parking session in order to terminate the parking in case he wishes to terminate before its maximum time limit (if such limits exist), (and obviously there are cases where the user forgets doing so). Moreover, all the advantages for the accuracy and efficiency of enforcement as described above still exist in the cellular alternative of the invention. Of course, also the advantage of the first embodiment which enables distinguishing between various types of the system members (handicapped, resident, etc.) also exists in the cellular alternative. As before, in the case of a parking violation, the system can determine it immediately, in real time, and with the exact parking space location, and therefore an enforcement inspector can be sent directly to the specific parking space where the violation has occurred to fine the vehicle.

In the case that the car parks beyond the time limit, this can be easily verified by the sensor, and a respective massage can be sent to the driver's cellular phone.

Figure 6:
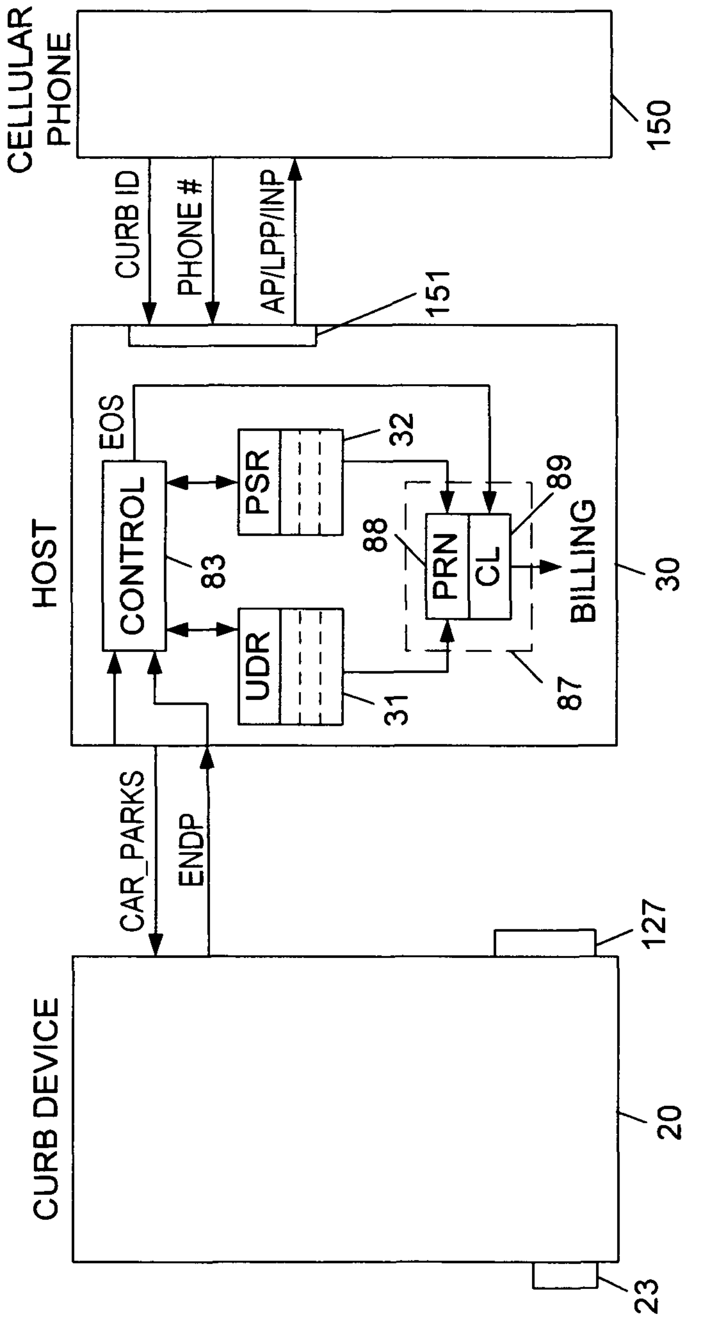
FIG. 6 illustrates a block diagram for an alternative use of the invention for cellular parking.

FIG. 6 illustrates the structure of the system when a cellular phone 150 is used as an alternative for the Car Device 10. At the beginning of the parking, the user initiates a phone call or sends an SMS to the Host 30 (typically to call center 151 within the Host 30). The call or message conveys to the Host 30 the visually shown Curb Device ID. The identity of the user and car can be easily determined by Host 30 from the user's telephone number and from the UDR 31. Furthermore, the validity of parking can be determined exactly as before, while a respective message AP/LPP/INP which corresponds to the parking validity verification (messages AP/LPP/INP of the first alternative) is sent back to the cellular phone, for example by means of SMS. Simultaneously, the Host can verifies that the car parks at the parking space a specified by the user, by receiving the signal CAR_PARKS from the Curb Device 20, which is essentially and indication of sensor 23. The end of parking message ENDP is issued by the Curb Device when sensor 23 no longer senses that the car parks at the parking space. The billing procedure is performed in the same manner as described for the previous alternative.

It should be noted that in still another alternative, the operator of the Car Device Parking and the operator of the Cellular Parking may use two different Hosts that are operated by two different entities. This alternative operates while the two Hosts share the required data between them, as necessary and exchange all the relevant information between them in real time by means of remote communication. The manner of operation, however, is essentially as described above.

In still another embodiment, the system may be implemented in Off-Street parking lots controlled by the gate barrier. In that case, a Curb Device is installed at the barrier and communicates with Car Devices while the cars entering or exiting the parking lot.

As noted, the Car Device 10 is battery operated, and it is important to ensure battery saving, or more specifically, to save the battery energy. For this purpose, the Car Device preferably has two modes of operation, a sleep mode which is a battery saving state, and an operational mode. When the car is out of the parking space, the Car Device may be partly in most energy saving sleep mode and partly in the operational (standby in this case) mode. When the Car Device is in Sleep Mode, it cannot receive or respond to an interrogation from the Curb Device 20, while a receipt and response can take place only during operational mode. For example, the device may stay in a sleep mode for 10 seconds, and at the end of this period the device may transfer to operational mode for 10 milliseconds in which it "listens" to possible interrogation from a Curb Device. Such a procedure may be performed repeatedly. If, for example, the Curb Device sends a sequence of requests that last 15 seconds, this ensures that an interrogation signal will be received and responded after at most one sleep mode period of 10 seconds.

During the parking, there is a need for the Car Device to determine when the car leaves the parking space, as upon leaving the parking space, the Car Device should terminate its internal counting of the active parking session, and record in its internal memory the duration of parking and other details such as date, beginning and end times, etc. In an embodiment of the invention, the Car Device and the Curb Device synchronize themselves just after they end the registration procedure. In such a way the Car Device knows when to expect for a confirmation signal (CONF, i.e., a signal that confirms the Car Device that it is within the parking space, as otherwise the confirmation signal will not be received in view the Car Device being of out of range). For Example, the Car Device and Curb Device may "agree" that a confirmation signal is sent every one minute after they synchronize their clocks. The Car Device may use its internal clock such it during the parking session it remains in a sleep mode 57 seconds out of every 60 seconds, and it opens (i.e., operational mode) during the rest 3 seconds to receive the confirmation signal. Such a procedure can operate in case that the Car Device knows for sure that a confirmation signal from the Curb Device is transmitted at least once during said 3 seconds. As long as the Car Device receives such a confirmation signal within said operational period (in this example 3 seconds), it knows that the session is still active. Immediately at the time when a confirmation signal is not received during said operational period (for instance during 2 minutes in this case), the Car Device terminates the parking session. It should be noted that even if the car does not receive a confirmation signal due to a faulty situation (for example, due to communication disturbances), still the system (including its billing function) operates accurately, as the termination of the parking is determined by the sensor of the Curb Device, and the information within the Car Device is used only for backup for the car user, if a future verification becomes necessary.

As previously mentioned, when the car leaves the parking lot, Sensor 23 reports the Host that the Space is empty again and the Host stops charging the parking fee for the leaving vehicle, is closing the current parking fee session and bills the user for the parking charge.

In the case that a vehicle enters a parking space, but does not provide its ID in return to the Curb Device ID request, the parking space is still announced as occupied but an alert is sent to the enforcement control informing them that an unidentified vehicle starts parking at the parking space whose location is known from the Curb Device who reports this event. The enforcement sends a riding inspector to check whether the parking car is allowed for a free park or he paid through an alternative payment channel or otherwise should be fined.

In case of a debated fine, the driver still has the ability to prove his innocence. As noted, the Car Device maintains in its (preferably embedded) memory a predetermined number of recent parking events, for example, the last 10 parking events. If the driver claims that he received a wrong ticket, his Car Device can be read by appropriate means. Reading and printing out the content of the Car Device memory will provide the evidence. The reason for embedding the memory unit inside the microcontroller is to avoid illegal manipulation. Only the authority has the access rights to this protected memory.

Example 1

Table 1 provides an example for the operation of a system according to an embodiment of the invention, assuming the system handles six parking spaces marked as B1-B6.

TABLE 1

| | Parking space ID | | | | | | |
|---|---|---|---|---|---|---|---|
| Accessories | B1 | B2 | B3 | B4 | B5 | B6 | Event Description |
| Curb Sensor | + | + | + | + | + | + | No parking cars |
| Curb SRRF | – | – | – | – | – | – | |
| Car RF | | | | | | | |
| Curb Sensor | + | + | + | + | + | + | Vehicle XXX |
| Curb SRRF | – | + | – | – | – | – | space No. B2 |
| Car RF | | + | | | | | |
| Curb Sensor | + | + | + | + | + | + | A non identified |
| Curb SRRF | – | 0 | + | – | – | – | Vehicle enters space |
| Car RF | | 0 | – | | | | B3 |
| Curb Sensor | + | + | + | + | + | + | Vehicle YYY enters |
| Curb SRRF | – | 0 | 0 | – | + | – | space B5 |
| Car RF | | 0 | | | + | | |
| Curb Sensor | + | + | + | + | + | + | Vehicle ZZZ enters |
| Curb SRRF | – | 0 | 0 | + | 0 | – | space B4 |
| Car RF | | 0 | | + | 0 | | |
| Curb Sensor | + | + | + | + | + | + | Vehicle XXX departs |
| Curb SRRF | – | – | 0 | 0 | 0 | – | From space B2 |
| Car RF | | | | 0 | 0 | | |
| Curb Sensor | + | + | + | + | + | + | A non identified |
| Curb SRRF | + | – | 0 | 0 | 0 | – | Vehicle enters |
| Car RF | – | | | 0 | 0 | | Space B1 |

TABLE 1-continued

| | Parking space ID | | | | | | |
|---|---|---|---|---|---|---|---|
| Accessories | B1 | B2 | B3 | B4 | B5 | B6 | Event Description |
| Curb Sensor | + | + | + | + | + | + | Current status |
| Curb SRRF | 0 | – | 0 | 0 | 0 | – | |
| Car RF | | | | 0 | 0 | | |

Index:
Communication ON—(+)
Communication OFF—(–)
Communication blocked—(0)
Curb SRRF—Curb Short Range RF transceiver
Car RF—The vehicle RF transceiver.

Initially, all the parking spaces B1-B6 are empty. All the Curb Sensors are in an ON position (i.e., in their sensing state) while all the Curb SRRF links are turned OFF.

A vehicle XXX enters space B2. Once the Curb Device Sensor of space B2 senses the car, the Curb Device B2 SRRF sends an ID request (interrogation signal INT) to vehicle XXX. When the car is stationary (as sensed by the accelerometer of the Car Device) The Car Device of XXX becomes operative, and receives the INT signal, and responds by sending its ID. It should be noted that, while all other Curb Devices SRRF are inoperative, only the Curb Device of B2 receives the ID response from car XXX. B2 reports to the Host through its LRRF communication link about the presence of XXX within B2 parking space, by sending the ID of Car Device XXX and the parking space PSID. The Host uses the ID compares the User Data against the PSR of B2, and assuming the parking is valid, a signal is sent to the Car Device of B2 and the parking begins. The Car Device of vehicle XXX cannot be accepted by any other parking space as long as the parking is valid. During the parking, a communication is periodically performed between the B2 Curb Device and the Car Device of XXX, to enable the Car Device to automatically determine when the parking session has ended (i.e., when it ceases to receive signals from the Curb Device of B2).

Later on, an unauthorized vehicle enters space B3. The sensor of B3 activates the SRRF of B3, which sends an INT signal to the Car Device of said vehicle. Any other vehicle does not respond to the B3 transmission because the nearby XXX Car Device RF is "blocked", i.e., it is already during parking communication with Curb Device B2. As the parking car in B3 does not respond, Curb Device B3 becomes occupied and it alerts the Host that a suspected car parks at space B3. At the same time, the SRRF of B3 becomes inactive.

Later on, car YYY enters space B5. The Sensor of B5 activates the B5 SRRF, sends an interrogation signal INT. Again nobody, excluding the Car Device YYY can receive the B5 interrogation as the Car Device of XXX is in an irresponsive mode for interrogation (i.e., it is during parking) and the Car Device in B3 (if at all exists) is in a non-responsive mode). YYY provides its ID, which is received only by B5. B5 can now update the Host. After authorization by the Host of the parking of YYY, the Car Device of B5 becomes irresponsive for interrogation, and the Curb Device of B5 does no longer sends interrogation signals.

Now vehicle ZZZ enters parking space B4. The Curb Device of B4 sends INT signal, and the Car Device of ZZZ answers, while none of the neighborhood Curb Devices and Car Devices is able to participate in this communication. After allowing the parking (signal AP as received by the Curb Device of B4 and forwarded to the Car Device of ZZZ), the Curb Device of B4 as well as the Car Device of ZZZ become irresponsive for interrogation communication. At this time vehicle XXX leaves parking space B2. The Curb Device of B2 reports that the parking space of B2 becomes available again for parking. However, the interrogation communication of B2 is still inactive because the space is empty.

An unidentified car enters B1. The Curb Device of B1 interrogates for an ID, but receives no answer. Again none of the neighborhood cars can listen, as they are in their irresponsive mode for interrogation communication. After not receiving any reply, B1 alerts the enforcement.

In an embodiment of the invention, the ON-OFF button may be used to keep the device in an OFF state most of the time, and for turning it ON only upon approaching a parking space. Upon exiting the parking space, the motorist may turn the device OFF.

A reliable communication with only the car existing within the parking space is ensured by several means: (a) the very short range of communication between the Curb Device and the Car Device (i.e., typically about 3-10 meters). The very short range is ensured by adaptation of the Curb Devices transmission power and sensitivity of Car Devices; (b) a possible use of a narrow angle antenna by the Curb Devices; (c) the activation of the Car Device by the accelerometer only when the car is passive; (d) the relatively low expectation that two cars come to the range of communication by a same Curb Device exactly at the same moment.

An accurate determination of the exact parking space where a car parks is important for providing the public with the most reliable real time parking information, and for enabling a significant saving of enforcement manpower. As a result, only violating cars are attended by the inspection. The providing of the most accurate location of the violators saves unnecessary traveling and searching time by the enforcement inspectors.

In an embodiment of the invention, after completion of the parking approval procedure (a first mode of communication), a second mode of communication begins where the Curb Device sends a certain parking information such as location, date and time to the Car Device and they mutually create a private coded communication protocol, which will not be accepted by any other Curb Device or Car Device excluding these two communicating devices. During the first mode these two devices synchronizes their clocks in order to enable similar time steps in both devices. From now on the two devices are linked together in a parking lot, using unique coded communication while their clocks step together along the time.

Periodically during the parking session, for example, every one minute, the Curb Device sends a coded massage to the respective Car Device, which includes among others, the accumulated parking charge for this particular parking session. Having such communication carried out only once a minute is directed to save battery power for both devices.

This feature enables also the option to activate the Car Device LED during the entire parking session. In case of illegal parking, the red LED lights, a fact that helps the enforcement to locate violators especially during the dark hours.

The present invention can also be used for the management of parking in off-street parking lots. When a vehicle equipped with the Car Device 10 approaches a gate of an automated parking garage (equipped with a device similar to the Curb Device, which represents in this respect the entire parking lot), the gate sensor performs verification in a manner as described above with respect to FIG. 4, to confirm the validity of parking. If not confirmed, the barrier remains closed. If confirmed, the barrier is opened. The confirmation of the parking, together with the knowledge about the occupancy of the parking garage enables the host to be updated regarding the total available space, and to charge the motorist. When the vehicle approaches the gate to exit, the barrier opens again. The information is conveyed to the host for updating the occupancy and for closing the parking session. The system knowledge in real time with respect to the available parking spaces can be displayed to the public over dedicated signs or by other means. This enables a motorist to use a same Car Device for on-street parking and off-street parking as well. It will also simplify and significantly reduce the equipment investment costs of an automated parking garage.

In an embodiment of the invention, the optional ON-OFF button of the Car Device may be used by the motorist upon entering or exiting the parking garage. Such a manner of operation prevents opening of the parking lot gate when the car just passes near the gate or parks inside the parking lot in a close distance to the gate.

The present invention provides several additional advantages:

a. easy location of stolen or suspected vehicles in real time, as upon parking of a car having a Car Device, the Car Device ID can provide knowledge about the car itself, its license plate, its owner, etc.;

b. Forwarding of certain personal information to the car owner regarding, for example, unpaid tickets, residential or permit status, etc. In one alternative, this information is sent through the Curb Device and displayed at the LCD of the Car Device 10. In an alternative embodiment, this information is sent to the motorist cell phone by SMS message or similar.

c. Providing the motorist with an option to locate the address of his parking car in case he has forgotten where he parked. The address can be sent via SMS to the driver's cell phone as a regular service or upon request.

d. Providing an infrastructure for developing special navigation GPS-based software for locating the nearest empty parking space almost in real time.

The invention claimed is:

1. A parking system, which comprises:

a) plurality of Curb Devices, each Curb Device having its own unique Curb Device ID and is installed close to a corresponding parking space;

b) plurality of Car Devices, each Car Device is provided with its own unique Car Device ID, and is positioned at a corresponding car at a location which is visible from the outside;

c) a Host which is provided with Users Data and Parking Spaces Data, for remotely managing, connecting between a specific parking car and a specific parking space, billing, enforcing and controlling on line and in real time parking of vehicles at each of said parking spaces;

wherein:

(A) each Curb Device further comprises:

A1) a sensor for sensing coming and leaving of a vehicle within the respective parking space and providing indication accordingly to a controller of said Curb Device;

A2) a Short Range RF Curb Device transceiver;

A3) a Long Range RF Curb Device transceiver; and

A4) a Curb Device Controller for:

upon sensing the approaching of a vehicle to the parking space, sending an interrogation signal to the Car Device of said vehicle by said Short Range RF transceiver;

in response to said interrogation signal, receiving the ID of the Car Device, and forwarding request for parking to the Host via said Short Range RF transceiver, which includes said ID of the Car Device and the Curb Device ID;

receiving from the Host an approval for the parking signal, approval for a limited time parking signal, or denial of the parking signal, and forwarding the same to the Car Device; and upon sensing leaving of the vehicle of the parking space, sending an end of parking signal to the Host;

(B) each Car Device further comprises:

B1) Short Range RF Car Device transceiver for communicating with a Curb Device;

B2) lighting means for giving a visual indication from the exterior of the car, for a valid parking or invalid parking;

B3) a Car Device microcontroller for:

receiving said interrogation signal from a Curb Device via said transceiver, and sending in response said ID of the Car Device;

upon receipt of approval from a Curb Device, initiating a parking session during which a clock is activated for counting the period of the parking, while further providing said valid parking visual indication, or upon receipt of a non-approval for a parking from a Curb Device, providing said invalid parking visual indication; and at the end of a parking period, terminating said clock;

(C) the Host further comprises:

C1) a Users database which stores for each Car Device a User Data Record, which details at least the ID of the Car Device given to that user, the License Plate of the car to which the Car Device has been assigned, and personal details of the Car Device user to which said Car Device has been assigned;

C2) a Parking Spaces database which stores for each Parking Space a Parking Space Record, which details at least the regulations applied for this specific Parking Space, and the cost per minute of parking in said parking space; and C3) a control unit for:

upon receipt of said request for parking from a Curb Device, and having the Curb Device ID and Car Device ID, comparing the corresponding user data record with the corresponding Parking Space Record, and issuing one or more of: approval for the parking signal, approval for a limited time parking signal, or a denial of the parking signal, and forwarding to said Curb Device, and further, initiating a parking session for this request if said approval was issued; and upon receipt of an end of parking signal from the Curb Device, terminating the parking session, counting an accumulated charge for the parking, and billing said user.

2. System according to claim 1, wherein the Car Device further comprises an accelerometer, for activating the transceiver of the Car Device when the car is stationary.

3. System according to claim 1, wherein said termination of the parking session at the Car Device occurs when said accelerometer is reactivated after an active parking.

4. System according to claim 1, wherein during a parking session a confirmation signal is sent periodically from the Curb Device to the Car Device, and wherein the Car Device maintains the parking session as active as long as it receives said confirmation signal, while terminating the session when ceasing to receive this signal.

5. System according to claim 4, wherein termination of a parking session occurs at the Car Device when it ceases to receive a request for confirmation signal.

6. System according to claim 1, wherein the Car Device further comprises a memory for recording details relating to plurality of concluded parking sessions.

7. System according to claim 1, wherein the Host further determines and issues in real time indications relating to each specific violation of a parking session, each of said violation indication is sent to a respective enforcement inspector, thereby to handle only proven violation or suspected violation cases.

8. System according to claim 1, wherein the enforcement by an inspector is performed by:

a) an inspector sending license plate number of a suspected car to the Host;

b) the Host, given said license plate number, retrieves the Car Device ID which corresponds to said license plate number, and further verifies the validity of present parking by said Car Device;

c) the Host, in the case that said verification shows a present valid parking, further sends a Valid Parking signal to the respective Car Device via the Curb Device which corresponds to said present valid parking; and d) the Car Device, upon receipt of said Valid Parking signal, illuminates said lighting means in a predefined manner to indicate to the inspector that the parking is valid.

9. System according to claim 1, wherein the Host further provides to the public real time notifications on availability of one or more parking spaces via public signs, or via mobile devices.

10. System according to claim 1, wherein one Curb Device manages plurality of simultaneous parking sessions by plurality of Car Devices.

11. System according to claim 1, wherein the antenna of the Curb Device is a directional antenna.

12. System according to claim 1, wherein the range of communication by said short range RF communication is up to 10 meters.

13. System according to claim 1, wherein the Curb Devices are hidden below a layer of concrete or asphalt, or installed on the surface of the asphalt, or above the Curb.

14. System according to claim 1, wherein the Curb Devices are battery operated or main electricity operated.

15. System according to claim 1, wherein the Curb Device stays partially at a sleep mode to save battery energy.

16. System according to claim 1, wherein the lighting means at the Car Device uses first color LED for valid parking, and a second color LED for invalid parking.

17. System according to claim 1 wherein the Car Device further comprises an LCD display for displaying to the user one or more of information relating to an active parking session, reasons for invalidity or non-approval of parking, limitations to approved parking session, or older saved parking sessions.

18. System according to claim 1 used for off-street parking, wherein said Curb Device operates a gate of a parking garage and the host monitors the level of occupancy of the garage.

19. System according to claim 1 for Cellular Parking use by a driver of a parking car which is not provided with a Car Device, wherein:

said Users database stores for each car a User Data Record, which details at least the user's cellular phone number, the License Plate of the respective car, and personal details of the cellular phone user of that car including payment means; the ID of the Curb device is visually displayed;

the car driver requests initiation of a parking session by sending a message to the Host which includes the Curb Device ID, whichever is the case;

a message with respect to the validity of parking and possible initiation of a parking session is sent back to the user's cellular phone; and the termination of the parking is automatically determined by means of said Curb Device sensor, which senses that the respective car has left the parking space, and by said Curb Device sending a respective message to the Host.

20. System according to claim 19 for Cellular Parking use by a driver of a parking car which is not provided with a Car Device, wherein the Host further determines and issues in real time indications relating to each specific violation of a parking session, each of said violation indication is sent to a respective enforcement inspector, thereby to handle only proven violation or suspected violation cases.

* * * * *